United States Patent [19]

Atkinson et al.

[11] 4,287,095

[45] Sep. 1, 1981

[54] HIGH SURFACE AREA TRANSITION METAL CATALYSTS AND METHOD OF PREPARING SAME

[75] Inventors: Gary B. Atkinson, Reno; Larry J. Nicks, Fernley; Donald J. Bauer, Reno, all of Nev.

[73] Assignee: The United States of America as represented by the Secretary of the Interior, Washington, D.C.

[21] Appl. No.: 162,542

[22] Filed: Jun. 24, 1980

[51] Int. Cl.[3] ...................... B01J 27/22; B01J 21/06; B01J 23/12; B01J 23/78
[52] U.S. Cl. .................................. 252/443; 252/470; 252/472; 252/473
[58] Field of Search ............... 252/443, 472, 473, 470; 148/16

[56] References Cited

U.S. PATENT DOCUMENTS

| | | | |
|---|---|---|---|
| 2,449,775 | 9/1948 | Hendriksen | 252/472 X |
| 4,071,473 | 1/1978 | Atkinson et al. | 75/235 X |
| 4,139,551 | 2/1979 | Ozyagcilar | 252/472 X |

Primary Examiner—W. J. Shine
Attorney, Agent, or Firm—William S. Brown; Donald A. Gardiner

[57] ABSTRACT

Highly active catalysts, suitable for use in hydrogenation and other reactions, are prepared from an alloy of one or more of the Group VIII transition metals with a Group IIA metal, a Group IVB metal, or an actinide. The alloy is ground to the desired particle size and is thereafter reacted with a gas, such as carbon monoxide and hydrogen, to form an intimate physical admixture of the Group VIII metal or its corresponding carbide with the oxide of other metal.

5 Claims, No Drawings

HIGH SURFACE AREA TRANSITION METAL CATALYSTS AND METHOD OF PREPARING SAME

BACKGROUND OF THE INVENTION

This invention relates generally to manufacture and activation of metal-containing catalysts suitable for use in hydrocarbon conversion reactions. More particularly, this invention concerns a method for making a metal- or metal carbide-metal oxide catalyst especially useful for promoting hydrogenation reactions in general and the methanation reaction in particular. A method of this type is described in U.S. Pat. No. 4,071,473, issued Jan. 31, 1978. In that method, catalysts are prepared from an alloy of one or more of the Group VIII transition metals with yttrium or a rare earth metal. The alloy is ground to the desired particle size and is thereafter reacted with a gas containing carbon monoxide and hydrogen to form an intimate physical admixture of the Group VIII metal or its corresponding carbide with the oxide of yttrium or the rare earth metal. The present invention relates to a similar method which is applicable to metals other than rare earths and yttrium.

SUMMARY OF THE INVENTION

The present invention involves a method of preparing a catalyst which comprises providing an alloy of at least one Group VIII transition metal and at least one further metal selected from the group consisting of Group IIA metals, Group IVB metals and actinide metals, and reacting said alloy with a gas at a temperature sufficiently high and for a time sufficiently long to oxidize said further metal to produce a catalyst comprising said transition metal and an oxide of said further metal.

DETAILED DESCRIPTION

U.S. Pat. No. 4,071,473 relates to alloys of a Group VIII transition metal and certain metals (yttrium or rare earths). It might have been predicted that a metal as reactive as aluminum, from Group IIIA, could be substituted for a rare earth in the alloy, thereby obtaining similar results. However, we have found that this is not the case. We have not been successful in using representative Group IIIA metals in the process of U.S. Pat. No. 4,071,473. Similarly, we have not been successful when attempting to use Group VB metals. Quite surprisingly, however, we have been successful using representative elements of the actinide series, Group IIA metals and Group IVB metals.

A high surface area active catalyst is formed by reacting an alloy with a reactive gas mixture to oxidize one of the alloy components while leaving other alloy components in the metallic state. The alloy comprises one or more of the transition metals of Group VIII of the Periodic Table with one or more metals selected from the group consisting of actinides, Group IIA metals and Group IVB metals, referred to here for convenience as the "second component" metal. Preparation of the catalyst is accomplished by reaction of the alloy with a reactive gas containing both carbon monoxide and hydrogen. At temperatures above about 300° C., this gas mixture reacts with the second component metal contained in the alloy to form an intimate dispersion of the transition metal with oxides of the second component metal.

While treatment of the alloy with the reactive gas at temperatures above about 300° C. results in an active and useful catalyst, further surface area development can be attained in a second, activation step. This activation step comprises further treatment with the same gas but at a reduced temperature, i.e., below about 275° C. and preferably below 250° C. The resulting catalysts are useful in hydrogenation reactions in general and in the methanation reaction in particular.

The alloys contain a first component which may be any one of the transition metals of Group VIII of the Periodic Table or mixtures of these with a second component which may be any one of the actinides, Group IIA metals or Group IVB metals. Alloy composition is not critical; a broad range of the two components can be used to produce useful catalysts. Alloy composition may usefully range from 5% to about 95% by weight of the first component metal with the balance being made up of the second component metal. More preferred compositions range from about 10% to about 80% by weight of the first component material. Nickel is preferred as the first component metal.

The alloy may be formed by fusion of the two metal components in the desired proportions under an inert atmosphere. Arc melting the alloy components on a water cooled copper hearth in a helium atmosphere is a convenient and entirely satisfactory method for forming the alloy. After the alloy is form, it is cooled, preferably under an inert atmosphere, and then is comminuted to a convenient particle size. Since the alloys or interest are brittle, comminution may be accomplished using conventional crushing and grinding techniques.

Any one of the Group VIII transition metals, iron, cobalt, or nickel, may be used as the first alloy component, but nickel is preferred because of its generally higher catalytic activity. These metals may be also used in combination to make up the first component.

The reactive gas used to form the catalyst preferably contains both hydrogen and carbon monoxide. It may be a mixture containing only hydrogen and carbon monoxide or it may be in admixture with other gases, including steam, carbon dioxide, lower hydrocarbons such as methane and similar gases. Inert diluent gases such as helium may also be used in the gas mixture. When the catalyst is to be used in methanation reactions, synthesis gas is preferred as the activating agent as it is readily available and produces entirely satisfactory results.

Initial catalyst formation is accomplished by reacting the alloy particles with the reactive gas at temperatures sufficiently high to oxidize the second alloy component. Oxidation is initiated at temperatures of about 300° C. Much higher temperatures can be used but little advantage is gained at temperatures above about 600° C. A preferred temperature range is about 350°–550° C. Suitable pressures may range from ambient to about 100 atmospheres. Reaction is continued until substantially all of the second alloy component has been oxidized. The time required to complete oxidation is dependent upon temperature, upon reactive gas composition and upon gas flow rate, but is generally in the range of 1 to 24 hours. At the end of the oxidation step, the product displays useful catalytic properties and may be used to promote hydrogenation, methanation, and like reactions.

Both BET surface area and active surface area can be substantially increased by subjecting the catalyst to a subsequent activation step. This step comprises contacting the catalyst with a carburizing reagent under conditions suitable to produce a carbide of the transition metal while the second component metal is retained as the oxide. The carburizing reagent is preferably a mixture of hydrogen and carbon monoxide and is conveniently the same gas mixture used for oxidation. Temperatures employed in this step must be below about 275° C., and preferably below about 250° C., with pressures being generally at least atmospheric, and up to 100 atmospheres, and preferably about 10 atmospheres. Use of elevated pressure in this activation step is generally necessary to avoid carbon deposition. In addition, use of similar elevated pressures in the initial catalyst formation step is preferred when the subsequent activation step is to be employed. Contacting time is dependent upon temperature and other variables, but again, is in the general range of 1 to 24 hours. Care should be taken to avoid too low temperatures in the activation step when nickel is present as the first alloy component so as to avoid any substantial production of nickel carbonyl. Minor losses of nickel as the carbonyl can be tolerated provided that proper precautions are taken to dispose of the gas.

X-Ray diffraction and chemical analyses performed on the product of the initial catalyst formation step indicate that the second alloy component is converted to the oxide form while the first alloy component remains substantially in the metallic state. Similar analyses performed on the product of the activation step indicate that much of the transition metal is converted to the corresponding metal carbide.

The catalyst, either as initially formed or following activation, is stable if cooled to room temperature under an atmosphere of either the reactive gas or an inert gas. It is stable in air, can be handled and stored without hazard, and used in a chemical reaction without further treatment. However, if the catalyst is de-gassed, as by heating in vacuum, it becomes pyrophoric.

Reactions catalysed by the catalyst of the invention include hydrogenation reactions in general such as the hydrogenation of unsaturated hydrocarbons, alcohols, and the like. The catalyst is particularly useful for promoting the methanation reaction which is the reaction of carbon monoxide and hydrogen to product methane and water vapor. Testing of the catalyst in the methanation reaction has indicated that the turnover number is quite high. Turnover number is a calculated value representing the number of molecules of methane formed per active catalyst site per second. Reaction conditions appropriate for use with the catalyst of this invention are essentially those of the prior art. Methanation, for example, may be accomplished at temperatures in the range of about 350° C. to 400° C., and at pressures ranging from about 1 to more than 100 atmospheres.

Details on the preferred methods for preparing the catalysts of this invention are given in the following examples.

EXAMPLE 1

An alloy containing 23.7 wt-pct zirconium and 76.3 wt-pct nickel is prepared by arc melting the components on a water cooled copper hearth in a helium atmosphere. The alloy is ground to minus 25 to plus 80 mesh and 3.4 grams is loaded into a ½-inch outside diameter stainless-steel tube reactor. Helium is used to flush the reactor before and during heating. When the temperature reaches 410° C., helium is replaced with a gas mixture analyzing 75 vol. pct $H_2$ and 25 vol. pct CO at 10 atmospheres pressure and a flow of 67 cc/min for 23 hours. While maintaining the gas composition of 75 pct $H_2$-25 pct CO, the flow at 67 cc/min and the pressure at 10 atmospheres, the temperature is decreased to 190° C. for 20 hours. Materials after treatment at 410° C. analyses 0.07 wt-pct carbon and X-ray diffraction indicates the presence of $ZrO_2$ and nickel metal. Surface area measurements performed by a standard gravimetric BET method for total area and CO chemisorption for active metal sites show a BET area of 4.9 $m^2/g$ and an active area of 2.1 $m^2/g$. After the low temperature treatment at 190° C. the material analyzes 3.0 wt-pct carbon and X-ray diffraction indicates the presence of $ZrO_2$, $Ni_3C$, and nickel metal. Surface area measurements show a BET area of 21.5 $m^2/g$ and an active area of 12.2 $m^2/g$. Methanation activity data shows the final material has high activity for the reaction $CO + 3H_2 \rightarrow CH_4 + H_2O$. Activity expressed as a turnover number (molecules $CH_4$/site/sec $\times 10^{+3}$) is 9.3 at 225° C.

EXAMPLES 2-5

Example 1 is followed using different alloys and with the differences noted in Table 1 which follows. Results of Examples 1-5 are included in Table 1.

TABLE 1

Experimental conditions and results for alloys treated to form a high surface area material

| | | (First Step) | | | | |
|---|---|---|---|---|---|---|
| Alloy Composition | Temp, °C. | Time, hrs | Pct. C | X-ray diffraction | Total Area $m^2/g$ | Active Area $m^2/g$ |
| (1.) $ZrNi_5$ | 410 | 23 | 0.07 | $ZrO_2$, Ni | 4.9 | 2.1 |
| (2.) $ZrNi_{2.5}$ | 410 | 21 | 0.38 | $ZrO_2$, Ni | 3.4 | 1.2 |
| (3.) $HfNi_5$ | 410 | 21 | 0.03 | $HfO_2$, Ni | 5.7 | 4.5 |
| (4.) $CaNi_5$ | 400 | 20 | 0.75 | CaO, Ni | 1.8 | 1.0 |
| (5.) $UNi_5$ | 400 | 21 | 0.24 | $UO_2$, Ni | 4.9 | 2.1 |

| | | (Second Step) | | | | | |
|---|---|---|---|---|---|---|---|
| Alloy | Temp, °C. | Time, hrs | Pct. C | X-ray diffraction | Total Area $m^2/g$ | Active Area $m^2/g$ | Turnover No. $\times 10^3$ @ 225° C. |
| (1.) | 190 | 20 | 3.0 | $ZrO_2$, $Ni_3C$, Ni | 21.5 | 12.2 | 9.3 |
| (2.) | 190 | 18 | 2.6 | $ZrO_2$, $Ni_3C$, Ni | 29.6 | 12.9 | 10.0 |
| (3.) | 190 | 20 | 2.0 | $HfO_2$, $Ni_3C$, Ni | 15.4 | 8.3 | 7.2 |
| (4.) | 185 | 20 | 7.0 | CaO, $Ni_3C$, Ni | 12.3 | 7.0 | 2.9 |
| (5.) | 190 | 23 | 3.1 | $UO_2$, $Ni_3C$, Ni | 26.9 | 17.6 | 10.8 |

What is claimed is:

1. A method of preparing a catalyst which consists essentially of:

providing an alloy of nickel and at least one further metal selected from the group consisting of zirconium, hafnium, calcium and uranium;

reacting said alloy with a gas comprising $H_2$ and CO at a temperature of about 300° to 600° C. for a time sufficiently long to oxidize said further metal to produce a catalyst consisting essentially of said nickel and an oxide of said further metal.

2. A method according to claim 1 comprising the further step of reacting said catalyst with a carburizing reagent at a temperature below about 250° C. for a time sufficiently long to carburize said nickel to produce a catalyst comprising a carbide of said nickel and an oxide of said further metal.

3. A method according to claim 2 wherein said carburizing reagent comprises a mixture of carbon monoxide and hydrogen.

4. A catalyst produced by the process of claim 1.

5. A catalyst produced by the process of claim 2.

* * * * *